United States Patent [19]
Harada et al.

[11] Patent Number: 5,103,477
[45] Date of Patent: Apr. 7, 1992

[54] METHOD AND APPARATUS FOR DESCRAMBLING A TELEVISION SIGNAL

[75] Inventors: Kimihito Harada; Akira Ideno, both of Tokyo, Japan

[73] Assignee: Pioneer Electronic Corporation, Tokyo, Japan

[21] Appl. No.: 569,034

[22] Filed: Aug. 17, 1990

[30] Foreign Application Priority Data

Mar. 16, 1990 [JP] Japan .................................. 2-63952

[51] Int. Cl.$^5$ ............................................. H04N 7/167
[52] U.S. Cl. ........................................ 380/15; 380/10; 380/19; 380/20
[58] Field of Search .................... 380/7, 10, 15, 19, 20, 380/21

[56] References Cited

U.S. PATENT DOCUMENTS

| | | | |
|---|---|---|---|
| 4,336,553 | 6/1982 | Dentoonder et al. | 380/7 |
| 4,424,532 | 1/1984 | Dentoonder et al. | 380/7 |
| 4,636,852 | 1/1987 | Farmer | 380/15 X |

Primary Examiner—Bernarr E. Gregory
Attorney, Agent, or Firm—Sughrue, Mion, Zinn, Macpeak & Seas

[57] ABSTRACT

An extension control signal for a vertical blanking interval (VBI) rises at a timing delayed from the last key signal before the VBI by 64 μsec plus the time difference between the key signal and horizontal synchronizing signal section, and falls at a timing delayed from the first key signal after lack of the key signal detection by an extension period of the horizontal synchronizing signal section plus the above time difference.

10 Claims, 7 Drawing Sheets

FIG. 7 (b) IFv PRIOR ART

FIG. 7 (c) IFv PRIOR ART

FIG. 7 (d) IFa PRIOR ART

METHOD AND APPARATUS FOR DESCRAMBLING A TELEVISION SIGNAL

BACKGROUND OF THE INVENTION

The present invention relates to a method and apparatus for descrambling a television signal which has been scrambled so as to disable unauthorized viewers from watching programs in a CATV system.

In general CATV systems, programs produced in a center and those aired are transmitted to terminal equipment through cables. Part of programs produced in the center are made chargeable. When a viewer at a terminal watches such a chargeable program, a predetermined fee is charged to him.

Thus, to disable unauthorized viewers from watching the chargeable programs, video signals of the chargeable programs are intentionally disorganized, i.e., scrambled at the center so that unauthorized television receivers cannot correctly receive them. On the other hand, the authorized viewers have a descrambling apparatus for restoring scrambled video signals to normal ones.

Thus far, various types of the scrambling and descrambling systems have been proposed. For example, in the so-called GSS (Gated Sync Suppression) system, only horizontal and vertical synchronizing signal sections of a television signal are suppressed by several dBs to produce a scrambled signal so that usual television receivers cannot establish the horizontal and vertical synchronization. On the other hand, in the authorized terminals, the horizontal and vertical synchronizing signal sections of the video signal are restored to the original levels.

FIGS. 7(a)-7(d) show a scrambling process in the aforementioned GSS system.

Figure 7A:
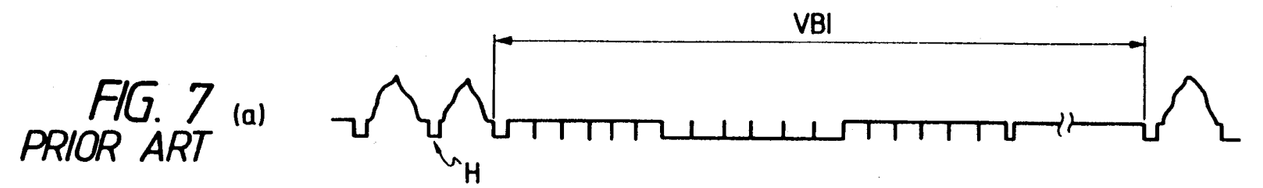
FIGS. 7(a) through 7(d) show signal waveforms describing a conventional scrambling method.
Figure 7B:
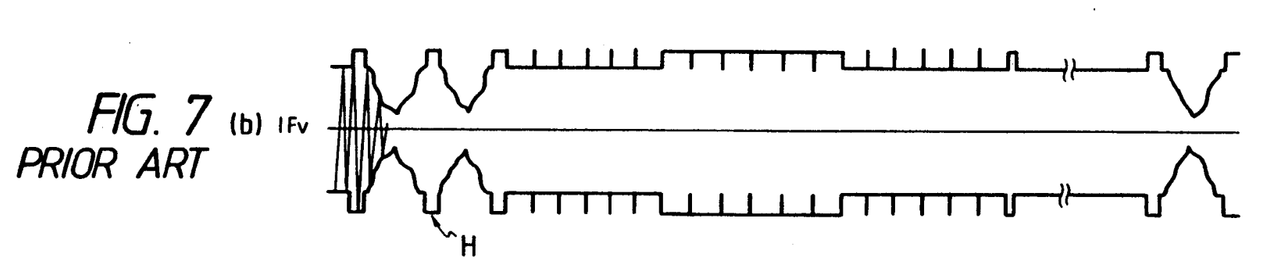
Figure 7C:
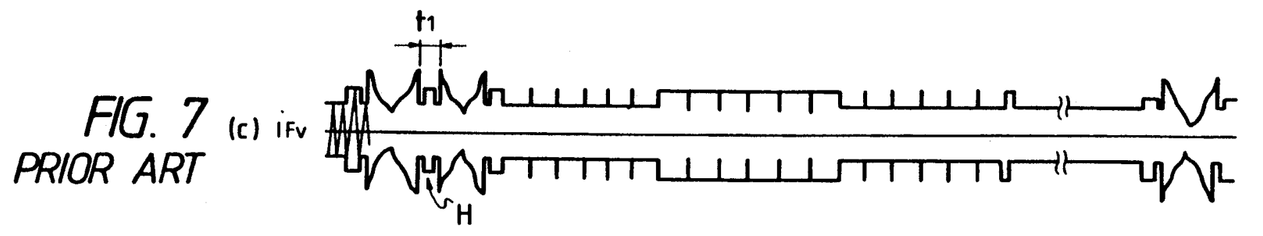
Figure 7D:
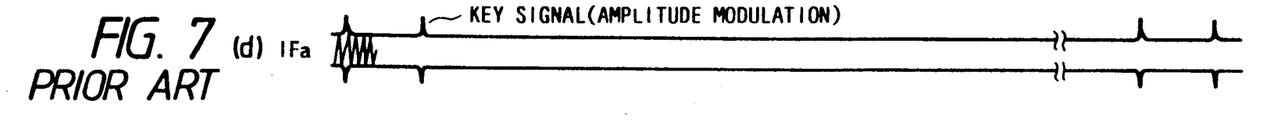

FIG. 7(a) shows a normal television signal of a base band. Character H in the figure represents a horizontal synchronizing signal. FIG. 7(b) shows the television signal modulated to an intermediate frequency video signal $IF_v$. At the transmission side, namely the center, the horizontal synchronizing signal section and the vertical blanking interval (VBI) section of the intermediate frequency video signal are suppressed by a particular amount, such as 6 dB or 10 dB, as shown in FIG. 7(c).

This suppression is conducted during a period $t_1$ of e.g., 12 μsec including the horizontal synchronizing signal period H and during the VBI. At the center, furthermore, a key signal representing the suppression timing is superimposed on an FM audio signal $IF_a$ (FIG. 7(d)). The resultant audio signal and the intermediate frequency video signal $IF_v$ (FIG. 7(c)) are modulated to an RF signal and transmitted to the terminal equipment.

The terminal equipment extracts the audio signal $IF_a$ from the received RF signal and AM-detects the key signal from the audio signal. After that, the terminal equipment restores, on the basis of timing of the detected key signal, the horizontal and vertical synchronizing signal sections of the video signal, which have been digitally suppressed, to the normal levels by extending them by 6 dB or 10 dB corresponding to the suppression rate at the transmission side. The period of the horizontal synchronizing signal section during which the video signal is to be extended by the terminal equipment is set to 10 μsec for example, which is slightly narrower than the suppression period. This is to stably operate the descrambling circuit and to prevent an edge portion of the picture section from being eliminated.

On the other hand, with respect to the VBI, when the terminal equipment detects the last horizontal synchronizing signal H preceding the VBI by, for example, a free-running timing generator which is initiated by the key signal K (i.e., when the terminal equipment detects a timing pulse which is generated, e.g., 96 μsec after the arrival timing of the last key signal K preceding the VBI), it recognizes the VBI and performs the extension operation in the VBI.

Furthermore, to more effectively disable unauthorized viewers from watching (pirating) chargeable programs, a scrambling means at the center randomly changes the temporal relationship between the key signal superimposed on the audio signal and the horizontal synchronizing signal section of the television signal. For example, six kinds of the temporal relationship are used; an extension pulse occurs $5 \times N$ μsec (N =0-5) after the key signal goes down.

The information N representing the temporal relationship (time difference) between the key signal and the horizontal synchronizing signal section of the television signal may be superimposed on the audio signal as in-band data, together with the key signal corresponding to the synchronizing signal section of the subsequent field following the VBI. This information is named "timing mode data" and the value N can be set for each field.

FIGS. 5(A)-5(G) show the operation as described above. That is, the figure describes the VBI of the video signal and the field portion just preceding it.

FIG. 5(A) shows synchronizing signals in a video signal; FIG. 5(B) shows a sync suppression pulse on the scrambling side; FIG. 5(C) shows a key signal superimposed on an audio signal; and FIG. 5(D) shows timing of extension pulses which occur on the descrambling side in synchronization with the fall (leading edge) of the key signal.

As was described above, the descrambling side obtains the key signal shown in FIG. 5(C) and generates a horizontal sync extension signal EH having a duration of 10 μsec $5 \times N$ μsec after the fall of the key signal of FIG. 5(C). Furthermore, the descrambling side generates a VBI extension signal EV 96 μsec after the fall of the key signal.

Thus, as shown in FIG. 5(E), there occurs in the horizontal synchronizing section non-restored pulses (so-called H-rabbit ear) having a duration of about 1 μsec before and after the horizontal synchronizing signal H. On the other hand, there occurs in the VBI section a non-restored pulse of a long duration (so-called VBI-rabbit ear). It is noted that the width of the VBI-rabbit ear varies depending on the relationship between the key signal and the suppression timing of the horizontal synchronizing signal section, which is represented by $5 \times N$ μsec.

The operation at the VBI termination is shown in FIGS. 6(A) through 6(G) which show the signals just before and after the VBI is terminated.

Figure 6:
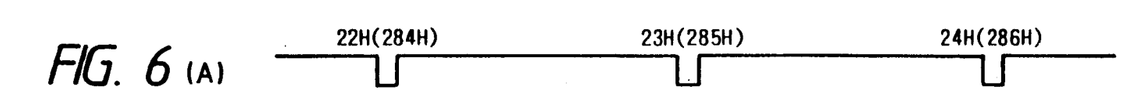
FIGS. 6(A) through 6(G) show signal waveforms describing the operation at the end of the VBI.

FIG. 6(A) shows synchronizing signals in a video signal; FIG. 6(B) shows sync suppression pulses on the scrambling side; FIG. 6(C) shows key signals superimposed on an audio signal; and FIG. 6(D) shows extension pulses generated on the descrambling side in synchronization with the fall (leading edge) of the key signal.

In the conventional descrambling apparatus, a VBI extension pulse is turned off when the key signal corresponding to the horizontal synchronizing signal of, for example, the 23rd line goes down, as shown in FIG. 6(D). However, at the scrambling side, the sync suppression pulse is turned off at a position after the horizontal synchronizing signal of the 23rd line.

Thus, as shown in FIG. 6(E), a VBI-rabbit ear whose width is $5 \times N$ μsec (N=0-5) occurs, and 10 μsec after that an H-rabbit ear occurs.

The two types of the VBI-rabbit ear which occur before (FIGS. 5(A)-5(G)) or after (FIGS. 6(A)-6(G)) of the VBI affect the reception and reproduction performance of a television receiver. In particular, in television receivers whose separation characteristics between the video intermediate frequency signal and the audio intermediate frequency signal is insufficient, "buzz" noise occurs in the demodulated sound at every 1/60 sec.

In addition, since a white level pulse is present before and after the VBI, the entire screen of a television receiver may become whitish due to the reflection in a CRT of electron beams corresponding to the white level pulse. (The scanning position of the white pulse itself is located outside of the screen.)

SUMMARY OF THE INVENTION

An object of the present invention is to provide a method and apparatus for descrambling a television signal which can minimize the degree of non-restored pulses occurring before and after the VBI on the descrambling side.

According to a first aspect of the invention, an apparatus for descrambling a scrambled television signal in which a horizontal synchronizing signal section and a vertical blanking section of a video signal are suppressed and a key signal is superimposed on an audio signal at a position corresponding to the horizontal synchronizing signal section, and which contains timing mode data indicating a time difference between the key signal and the horizontal synchronizing signal section, comprises:

key edge detection means for detecting a last key signal before the vertical blanking section and producing a last key edge signal at a timing of the last key signal;

extension control signal generating means for producing a first extension control signal which rises at a timing a predetermined period after the last key edge signal;

delay means for extracting the timing mode data to obtain information on the time difference, and for producing a second extension control signal by delaying the first extension control signal on the basis of the information on the time difference; and extension means for extending the vertical blanking section of the video signal during the second extension control signal.

According to a second aspect of the invention, an apparatus for descrambling a scrambled television signal in which a horizontal synchronizing signal section and a vertical blanking section of a video signal are suppressed and a key signal is superimposed on an audio signal at a position corresponding to the horizontal synchronizing signal section, and which contains timing mode data indicating a time difference between the key signal and the horizontal synchronizing signal section, comprises:

key edge detection means for detecting the key signal to produce a key edge signal at a timing of the key signal;

means for detecting lack of the key edge signal over a first predetermined period or more;

extension control signal generating means for producing a first extension control signal which falls at a timing a second predetermined period after first detection of the key edge signal after detecting the lack of the key edge signal;

delay means for extracting the timing mode data to obtain information on the time difference, and for producing a second extension control signal on the basis of the information on the time difference; and extending means for extending the vertical blanking section of the video signal during the second extension control signal.

With the construction described above, the information with respect to the time difference between the key signal and horizontal synchronizing signal section of the television signal can be obtained from the timing mode data transmitted as in-band data.

Thus, by generating the extension control signal for extending the VBI, which rises at the timing delayed by the above time difference plus the predetermined period, the difference between the timing of the suppression at the start of the VBI and that of the extension becomes almost zero. Consequently, the non-restored pulse (VBI-rabbit ear) which occurs at the start of the VBI due to the above time difference can be made very short.

Furthermore, when the key signal is first detected after the lack of the key signal over the predetermined period, the extension control signal of the VBI is stopped at the timing delayed by the predetermined period plus the above time difference. This almost eliminates the non-restored pulse (VBI-rabbit ear) at the end of the VBI.

DETAILED DESCRIPTION OF THE PREFERRED EMBODIMENTS

Now, referring to the accompanying drawings, embodiments according to the present invention will be described.

Figure 1:
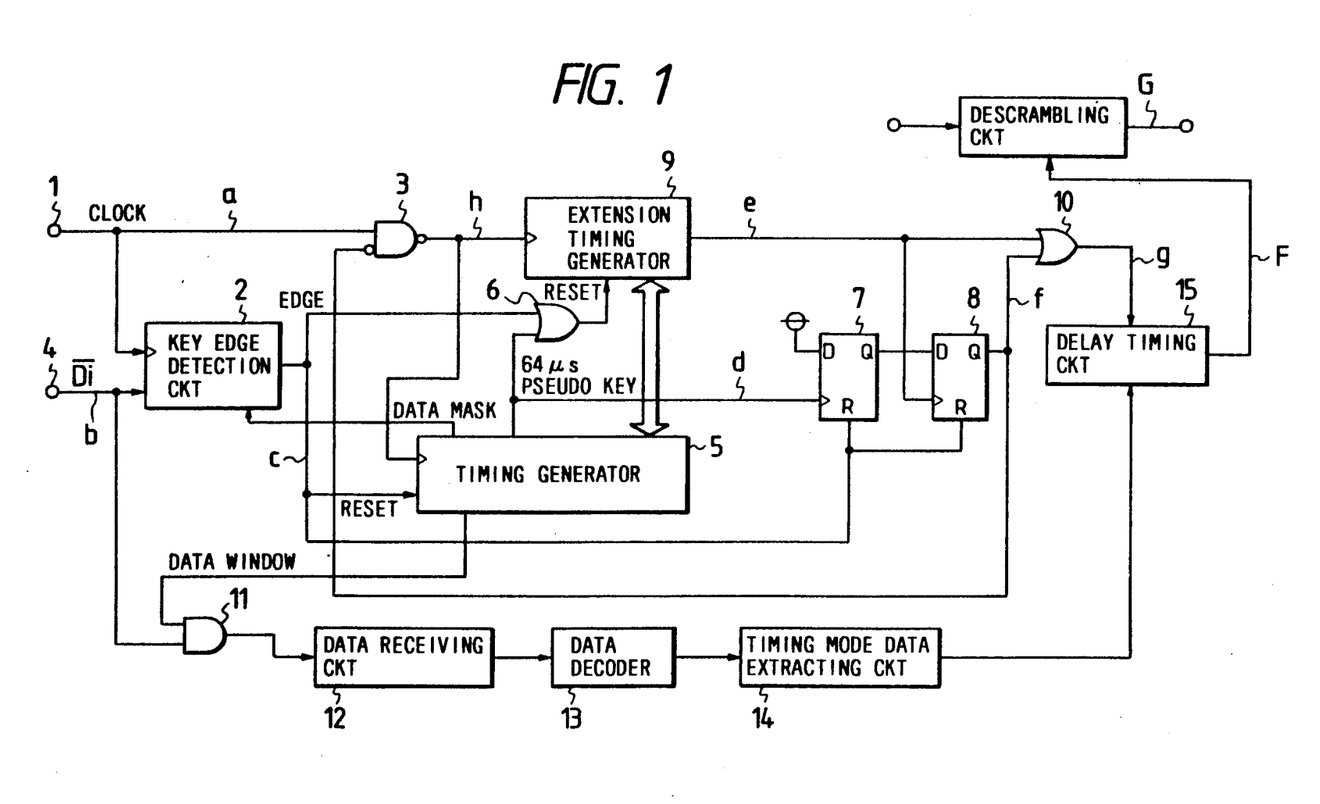
FIG. 1 is a block diagram showing a first embodiment of the present invention.

FIG. 1 shows an apparatus in which an extension control signal is generated to extend a VBI section which has been suppressed on the center side. FIGS. 2(b) through 2(h) show waveforms at individual parts of the apparatus.

Numeral 1 denotes a clock input terminal for receiving a 4 MHz or 8 MHz clock signal a. The clock signal a input to the terminal 1 is provided to a key edge detection circuit 2 and to one input terminal of a NAND gate 3.

A key signal b is input through an input terminal 4 to the key edge detection circuit 2. The key edge detection circuit 2 generates a key edge pulse c at a timing of the rise of the clock signal a only when the key signal is present, as shown in FIG. 2(c).

Figure 2:
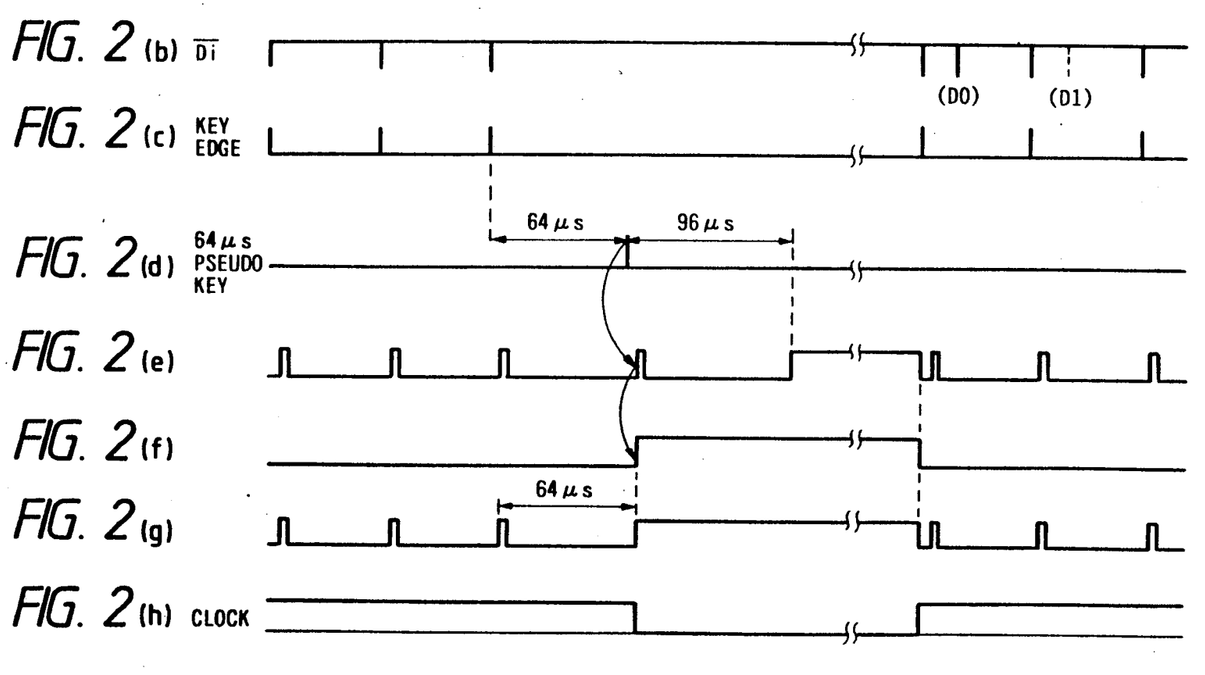
FIGS. 2(b) through 2(h) show signal waveforms describing the operation of the first embodiment.

$D_0$ and $D_1$ shown in FIG. 2(b) represent data pulses transmitted as in-band data and including the aforementioned timing mode data. The key edge detection circuit 2 does not detect the edge of the data pulses, as will be described later.

The key edge pulse c is input to a timing generator 5 as a reset signal, and the timing generator 5 generates various timing signals such as a pseudo key signal d, a data mask signal, and a data window signal.

The key edge pulse c is also input to one input terminal of an OR gate 6 and to each reset input terminal of a first shift register 7 and a second shift register 8.

The data mask signal from the timing generator 5 is provided to the key edge detection circuit 2, and used therein to mask the data pulse which is received just after the output of the key edge pulse, so as to prevent the edge pulse from being generated in response to the data pulse.

The timing generator 5 also outputs the pseudo key signal d, for example, 64 $\mu$sec after the key edge pulse c is received, as shown in FIG. 2(d). The pseudo key signal d is input to the other input terminal of the OR gate 6 and to the set input terminal of the first shift register 7.

On the other hand, the clock signal a is input to the timing generator 5 through the NAND gate 3 and to an extension timing generator 9.

The extension timing generator 9 is reset by the key edge pulse and the pseudo key signal d which are input through the OR gate 6. When the reset signal is not input for 96 $\mu$sec or more, the output signal of the generator 9 becomes high. Consequently, the output signal of the extension timing generator 9 becomes as shown in FIG. 2(e).

The output signal e generated by the extension timing generator 9 is input to one input terminal of an OR gate 10 and to the set input terminal of the second shift register 8.

The first shift register 7 and the second shift register 8 are reset by the key edge pulse c which is output from the key edge detection circuit 2. In this state, the pseudo key signal d shown in FIG. 2(d) is input to the first shift register 7 to set it. Consequently, the state of the D input terminal of the second shift register 8 goes high and the second shift register 8 is set by the output signal e of the extension timing generator 9 which is created in response to the pseudo key signal d. Thus, at the Q output terminal of the second shift register 8, an extension control signal f is generated which rises at the timing of the pseudo key signal d, as shown in FIG. 2(f).

In response to the signal f, the NAND gate 3 is closed, thereby stopping the clock signal a from being provided to the timing generator 5 and the extension timing generator 9 until the first shift register 7 and the second shift register 8 are reset by the key signal coming after the VBI.

As a result of the aforementioned operations, a signal g shown in FIG. 2(g) is output from the OR gate 10, which is a result of the OR operation of the signals e and f shown in FIGS. 2(e) and 2(f), respectively.

The signal g is output as a signal for controlling the extension of the VBI when a first predetermined period, namely, 64 $\mu$sec has elapsed from the reception timing of the last key signal before the VBI.

On the other hand, the timing generator 5 outputs the data window signal to one input terminal of an AND gate 11. The data window signal is generated at the timing that the in-band data is to be taken in. Consequently, only the data signal between the signals from the input terminal 4 is received by a data receiving circuit 12 as data.

The data received by the data receiving circuit 12 is decoded by a data decoder 13, and only the timing mode data N among the decoded data is extracted by a timing mode data extracting circuit 14.

Figure 5:
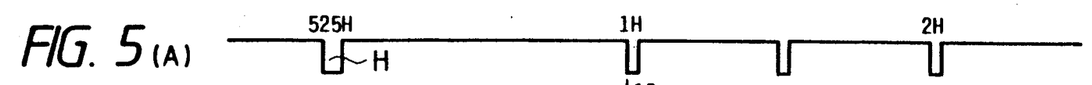
FIGS. 5(A) through 5(G) show signal waveforms describing the operation at the start of a VBI.

The data N extracted by the timing mode data extracting circuit 14 is provided to a delay timing circuit 15 which delays the signal g shown in FIG. 2(g) by $5 \times N$ $\mu$sec. Consequently, the delay of the output signal F of the delay timing circuit 15 becomes the aforementioned first predetermined period (64 $\mu$sec) plus $5 \times N$ $\mu$sec, as shown in FIG. 5(F). As shown in the timing waveform chart of FIG. 5, the output signal F starts the extension of the VBI signal (64 +5N) $\mu$sec after the last key signal is received.

Thus, as shown in FIG. 5(G), the non-restored pulse, namely the VBI-rabbit ear, which occurs when the VBI starts, becomes very short.

Referring to FIGS. 3 and 4(b)–4(i), another embodiment will be described which deals with the extension control signal at the end of the VBI.

Figure 3:
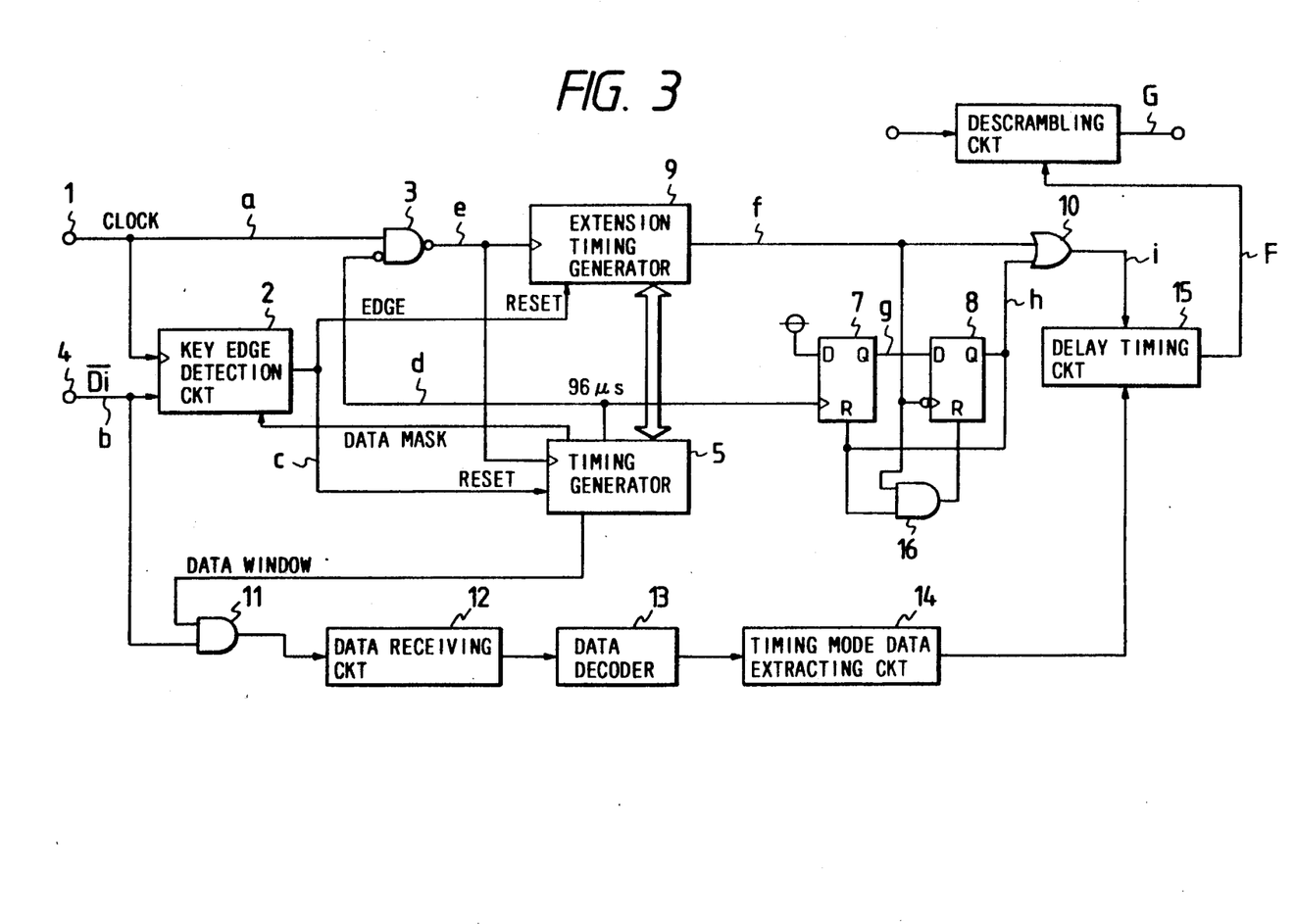
FIG. 3 is a block diagram showing a second embodiment of the present invention.

FIG. 3 is a block diagram showing the construction of the embodiment. The same numerals as FIG. 1 represent the same functions. Thus, the description for those parts will be omitted.

In the embodiment shown in FIG. 3, the reset input of the first shift register 7 is obtained from the Q output terminal of the second shift register 8, and the reset input of the second shift register 8 is obtained from the output of an AND gate 16 which performs logical multiplication of the Q output of the second shift register 8 and the output of the extension timing generator 9.

Figure 4:
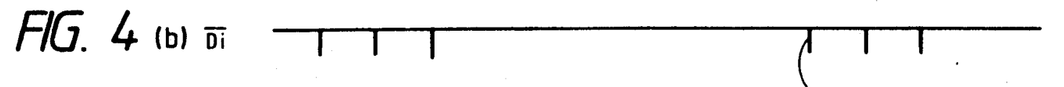
FIGS 4(b) through 4(i) show signal waveforms describing the operation of the second embodiment.

With the aforementioned construction, after the VBI is terminated, the subsequent key signal (FIG. 4(b)) is detected by the key edge detection circuit 2 and then provided to the timing generator 5 and the extension timing generator 9 as the key edge pulse c (reset signal). When the key edge pulse c is provided to the timing generator 5, the state of its output signal d changes from high to low. Consequently, the NAND gate 3 is opened and thereby the clock a is supplied to the timing generator 5 and the extension timing generator 9.

On the other hand, as shown in FIG. 4(f), when the clock a is provided to the extension timing generator 9, the state of the output signal f of the extension timing generator 9 changes from high to low. Thus, the second shift register 8 does not receive the reset input signal through the AND gate 16, and therefore outputs the signal h as shown in FIG. 4(h) at its Q output terminal.

When the signal h shown in FIG. 4(h) goes high, the first shift register 7 is reset and the state of its Q output terminal goes low as shown in FIG. 4(g). When the signal f of the extension timing generator 9 subsequently goes high, the AND gate 16 sends the reset signal to the second shift register 8 and thereby the state of the Q output terminal of the second shift register 8 returns to low as shown in FIG. 4(h).

Consequently, a signal i as shown in FIG. 4(i) is generated at the output of the OR gate 10, which can stop the output of the VBI extension control signal the second predetermined period, namely 10 μsec after the key signal is detected.

Furthermore, the blocks represented by numerals 11 to 15 causes the signal i, which is output from the OR gate 10, to be delayed by 5×N μsec in the same manner as the construction shown in FIG. 1. Thus, the output signal F from the delay timing circuit 15 can be obtained as a control signal for stopping the extension of the VBI (5N+10) μsec after the key signal is detected. As a result, as shown in FIG. 6(G), the non-restored pulse, namely the VBI-rabbit ear, does not occur at all at the end of the VBI leaving only the H-rabbit ear.

As described above, according to the present invention relating to the method and apparatus for descrambling a television signal in the GSS scrambling system in which the timing relationship between a key signal and a horizontal synchronizing signal section is varied with time, it is possible to minimize the width of non-restored pulses which occur before and after the VBI.

Consequently, adverse effects such as so-called "buzz" noise in reproduced sound of a television receiver and image deterioration due to white level non-restored pulses can be prevented.

We claim:

1. In an apparatus for descrambling a scrambled television signal in which a horizontal synchronizing signal section and a vertical blanking section of a field of a video signal are suppressed by a scrambler and later extended by a descrambler and a key signal, provided for each horizontal synchronizing signal section, is superimposed on an audio signal by a scrambler at a position corresponding to the horizontal synchronizing signal section, said key signal containing timing mode data indicating a time difference between said key signal and the horizontal synchronizing signal section, an extension apparatus for extending the amplitude of suppressed portions of said scrambled television signal, said extension apparatus comprising:

key edge detection means for detecting a last key signal before the vertical blanking section and producing a last key edge signal at a timing of said last key signal;

extension control signal generating means for producing a first extension control signal at a timing a predetermined period after the last key edge signal;

delay means for extracting the timing mode data to obtain information on the time difference, and for producing a second extension control signal by delaying the first extension control signal on the basis of the information on the time difference; and extension means for extending the vertical blanking section of the video signal during the second extension control signal.

2. The extension apparatus according to claim 1, wherein the predetermined period is about 64 μsec.

3. The extension apparatus according to claim 1, wherein the time difference varies with time.

4. The extension apparatus according to claim 3, wherein the time difference is represented by 5×N μsec, where N is an integer from 0 to 5.

5. In an apparatus for descrambling a scrambled television signal in which a horizontal synchronizing signal section and a vertical blanking section of a field of a video signal are suppressed by a scrambler and later extended by a descrambler and a key signal, provided for each horizontal synchronizing signal section, is superimposed on an audio signal by a scrambler at a position corresponding to the horizontal synchronizing signal section, said key signal containing timing mode data indicating a time difference between said key signal and the horizontal synchronizing signal section, an extension apparatus for extending the amplitude of suppressed portions of said scrambled television signal, said extension apparatus comprising:

key edge detection means for detecting the key signal to produce a key edge signal at a timing of the key signal;

means for detecting lack of the key edge signal over a first predetermined period or more;

extension control signal generating means for producing a first extension control signal at a timing a second predetermined period after first detection of the key edge signal after detecting the lack of the key edge signal;

delay means for extracting the timing mode data to obtain information on the time difference, and for producing a second extension control signal on the basis of the information on the time difference; and extending means for extending the vertical blanking section of the video signal during the second extension control signal.

6. The extension apparatus according to claim 5, wherein the second predetermined period corresponds to an extension period of the horizontal synchronizing signal section.

7. The extension apparatus according to claim 5, wherein the time difference varies with time.

8. The extension apparatus according to claim 7, wherein the time difference is represented by 5×N μsec, where N is an integer from 0 to 5.

9. In a method for descrambling a scrambled television signal in which a horizontal synchronizing signal section and a vertical blanking section of a field of a video signal are suppressed by a scrambler and later extended by a descrambler and a key signal, provided for each horizontal synchronizing signal section, is superimposed on an audio signal by a scrambler at a position corresponding to the horizontal synchronizing signal section, said key signal containing timing mode data indicating a time difference between said key signal and the horizontal synchronizing signal section, an extension method for extending the amplitude of suppressed portions of said scrambled television signal, said extension method comprising the steps of:

detecting a last key signal before the vertical blanking section and producing a last key edge signal at a timing of the last key signal;

producing a first extension control signal at a timing a predetermined period after said last key edge signal;

extracting the timing mode data to obtain information on the time difference;

producing a second extension control signal by delaying the first extension control signal on the basis of the information on the time difference; and extending the vertical blanking section of the video signal during the second extension control signal.

10. In a method for descrambling a scrambled television signal in which a horizontal synchronizing signal section and a vertical blanking section of a field of a video signal are suppressed by a scrambler and later extended by a descrambler and a key signal, provided for each horizontal synchronizing signal section, is superimposed on an audio signal by a scrambler at a position corresponding to the horizontal synchronizing signal section, said key signal containing timing mode data indicating a time difference between said key signal and the horizontal synchronizing signal section, an extension method for extending the amplitude of suppressed portions of said scrambled television signal, and extension method comprising the steps of:

detecting the key signal to produce a key edge signal at a timing of the key signal;
  detecting lack of the key edge signal over a first predetermined period or more;
  producing a first extension control signal at a timing second predetermined period after first detection of the key edge signal after detecting the lack of the key edge signal;
  extracting the timing mode data to obtain information on the time difference;
  producing a second extension control signal by delaying the first extension control signal on the basis of the information on the time difference; and
  extending the vertical blanking section of the video signal during the second extension control signal.

* * * * *